July 16, 1968  SEIICHI WADA  3,393,028
LUBRICATING PAD FOR RAILROAD VEHICLE
Filed July 27, 1964  2 Sheets-Sheet 1
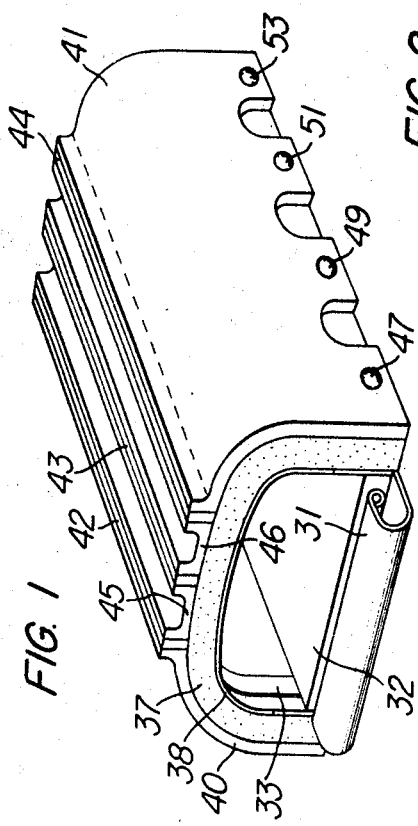
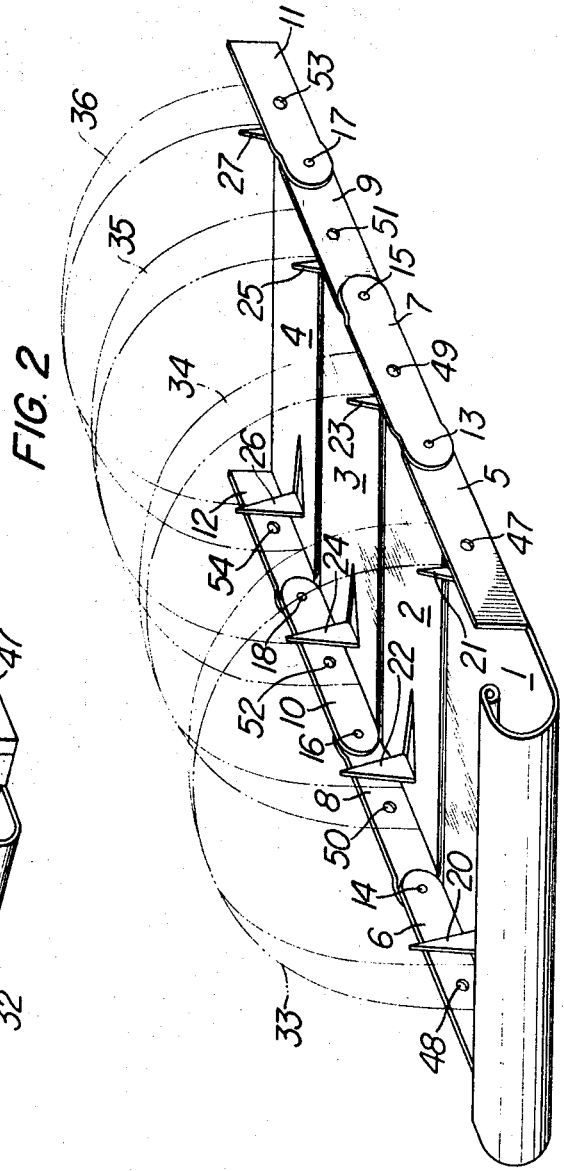
INVENTOR
Seiichi Wada
By: Paul M. Craig, Jr.
ATTORNEY

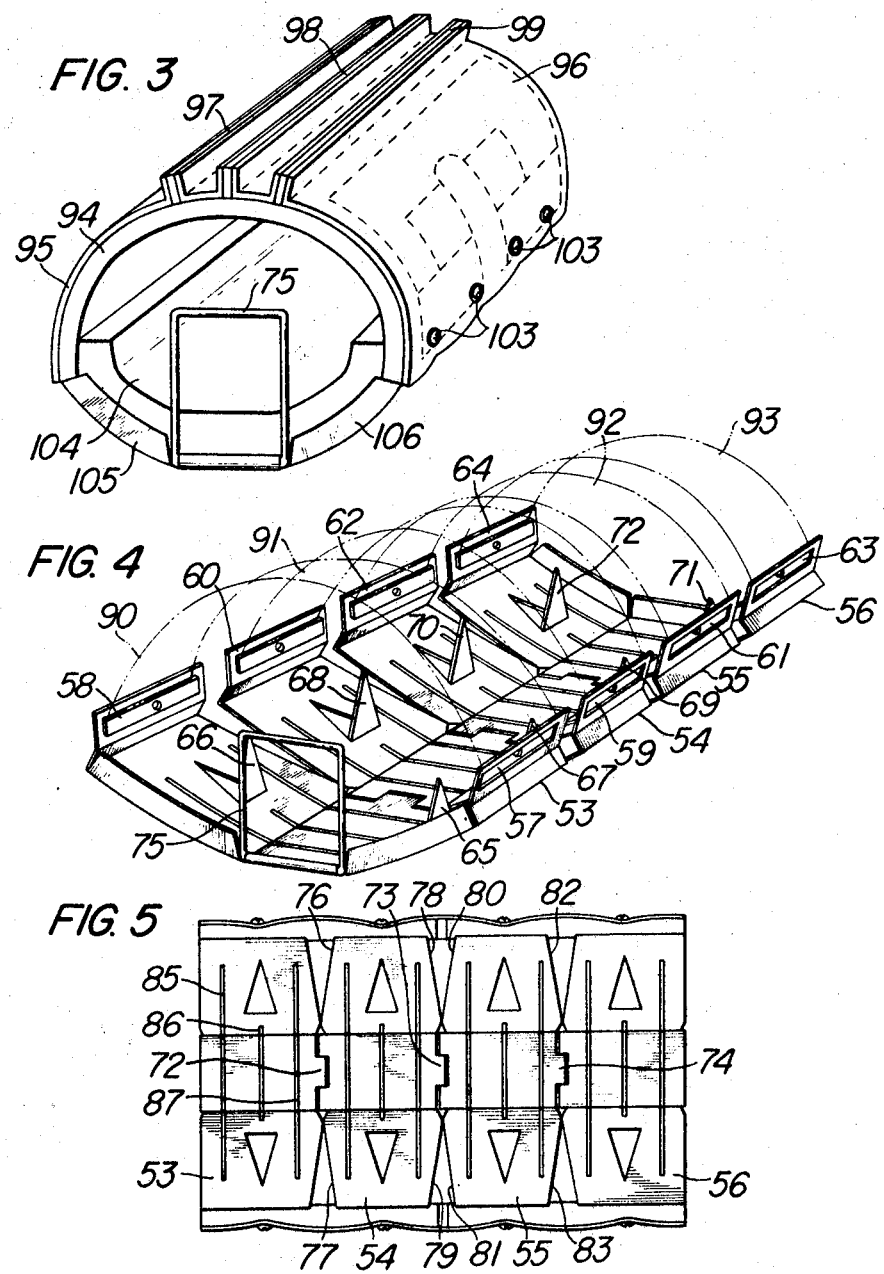

3,393,028
LUBRICATING PAD FOR RAILROAD VEHICLE
Seiichi Wada, Chigasaki-shi, Japan, assignor to Keeper Company Limited, Tokyo, Japan, a corporation of Japan
Filed July 27, 1964, Ser. No. 385,401
Claims priority, application Japan, Oct. 24, 1963, 38/79,695
9 Claims. (Cl. 308—243)

The present invention relates to a lubricating pad for supplying a lubricant oil to the axle of the running wheel in railroad vehicles.

In the axle box for the running wheel of the railroad vehicle, usually a plane bearing is used by reason of a low cost and a simple structure. In the axle box of this kind, the distance between the underside of the axle and the lower portion of the opening of the axle box is short, so that the opening gap for inserting oil pads into the axle box is considerably small. For supplying the lubricating oil to the axle and the bearing metal a loose mass of cotton or wool fibres has been used. However, as such fibres are able to move freely in the axle box, frequently they are caught between the axle and the bearing metal. This results in the heat damages of the bearing metal. For avoiding this disadvantage, cylindrical pads formed by enclosing fibrous material such as cotton threads or wool waste with a textile cloth have been used. Several cylindrical pads are positioned in the axle box in parallel to the longitudinal axis of the wheel shaft. The pads of this kind have a satisfactory oil retaining effect, but they are unstable. Particularly, when said cylindrical pads are used in the cold district, they are shifted to the one side of the axle box in accordance with the rotation of the axle by freezing of oil or water attached to the pads. In the start of the vehicle, the lubrication may be unsatisfactory.

The present invention prevents the aforesaid disadvantages in the prior lubricating pads and provides improved lubricating pads.

An object of the present invention is to provide a lubricating pad for the axle of railroad vehicles, comprising a plurality of base members, each member being hinged with the adjacent member to form a flexible base frame as a whole and supporting a thin spring blade of an arcuate shape projecting upwards, an oil retaining member made of rove-felt and disposed on the thin spring blades, of which the end portions are fixed to said base frame, an oil supplying member made of a fine-felt disposed on said oil retaining member, of which the end portions are fixed to said base frame together with said oil retaining member, one or more contact ridges extending longitudinally formed on the top of said oil supply member, said contact ridges being made of a fine-felt or a rove-felt material.

Another object of the present invention is to provide a lubricating pad for railroad vehicles, comprising a plurality of base members, each member being hinged with the adjacent member to form a flexible base frame as a whole and supporting a thin spring blade of an arcuate shape projecting upwards, said members are so formed in the channel type that the pad engages firmly with the axle box on the bottom and between the opposite side walls thereof, an oil retaining member made of rove-felt material disposed on said thin spring blades, of which the opposite side end portions are fixed to the upright portions of said frame, an oil supplying member made of fine-felt material disposed on said oil retaining member, of which the opposite side end portions are fixed to said upright portions, one or more contact ridges extending longitudinally formed on the top of said oil supplying member, said contact ridges being made of a fine-felt and/or a rove-felt material.

A further object of the present invention is to provide a lubricating pad for a railroad vehicle, particularly in which plane bearings are used for bearings of the running wheels or tires, said pad comprising base members hinged with each other made of a thin metal plate such as zinc or tin galvanized steel sheets, and said base members being provided with upright portions in the opposite sides to form a channel shape to conform to the shapes of the inner bottom portions of the axle boxes, wherein said oil retaining, oil supplying members and the spring blades are fixed together to the upright portions.

A further object of the present invention is to provide the lubricating pad as mentioned above, wherein the base member to be positioned in the most outer side is provided with a bent portion in the outer end thereof, said bent portion being formed integrally with the body portion of the member by bending the outer portion.

Further, the lubricating pad in the present invention may be provided with an oil keeping member which is positioned on the bottom of the base frame.

The lubricating pad according to the present invention contacts with the axle only in the top surface of the ridge. Therefore, the pad does not stick to the surface of the axle, because the contact area is small. This effect is considerable in cold districts or the winter season. In the cold districts or during the winter season, when the vehicles are standing for a long time, the lubricating oil and/or water which entered into the axle box will be disposed to freeze. This results in the sticking of usual lubricating pads to the axle. In this sticking status of the pad, if the vehicles start, the lubricating pad which has adhered to the axle becomes caught between the axle and the bearing metal surfaces by the rotation of the axle. In the lubricant pad according to the present invention, the contact area against the axle surface is considerably smaller, so that even if the freezing takes place, the sticking function is smaller than that in the usual pad. Therefore, upon the start of the vehicle the pad of the present invention can not be caught between the axle and the bearing metal.

The lubricating pad according to the present invention comprises the flexible base frame on which the members supplying the oil to the axle are mounted and said members are made of wool fabrics such as felts, as aforementioned. Therefore, the lubricating pad in the present invention is able to easily pass through the narrow gap between the under portion of the axle and the lower side of the opening of the axle box. On the top of the oil supplying member the ridge or ridges extending longitudinally and consisting of the same matrial as the oil supplying member are provided and the oil supplying and retaining members are supported with a number of the spring blades. Accordingly, the top surfaces of the ridges are able to contact with the peripheral surface of the axle under the desired pressure.

Further, in the lubricating pad of the present invention, as the contact with the axle is carried out only in the upper surface of the ridges, the contact area is small. Thus, even if any freezing took place between the axle and the ridges, the sticking effect is minor. Upon the starting rotation of the axle, the freezing can be easily broken, without any movement and shifting of the pad towards one side of the axle box. In the present invention, the spring plate, the oil retaining member and the oil supplying member are mounted together on the base frame. This construction results in a simplified structure that is easily assembled.

In the lubricating pad according to the present invention, the base frame is formed into the channel-type to conform to the configuration of the bottom portion of the axle box, so that the pad positioned in the axle box is very stable. Further, such channel shape is obtained by bending the opposite side portions of each base frame member to form integrally the upright portions with the body portion of said member.

In the pad of the present invention, the most outer member of the base members consisting of the base frame comprises a portion bent upwardly in the outer end thereof. This portion is serviceable as a handle and an index. That is, the handle is provided for drawing out the pad from the axle box and at the same time it is provided for detecting the level of the oil in the axle box.

Furthermore, in the lubricating pad according to the present invention, an oil keeping member consisting of wool such as a felt is disposed on the bottom in the base frame. This member prevents disturbance and loss of the oil in the axle box.

According to the present invention, the lubricating pad is provided with the ridge consisting of felt materials on the top of the oil supply member.

In general, two to four ridges are disposed on the oil supplying member. These ridges have the effect of filtering the oil to remove the metal particles which have entered into the oil by the wear of the bearing metal and at the same time the edges of the ridges scrape dust and said particles from the surface of the axle.

Other objects and the advantages of the present invention will be understood from the following descriptions referring to the accompanying drawings of the present invention, in which the drawings:

FIGURE 1 is a perspective view showing the lubricating pad according to the present invention;

FIGURE 2 is a perspective view showing the base frame, in an enlarged size for the pad shown in FIGURE 1, wherein spring blades mounted thereon are shown in chain lines;

FIGURE 3 is a perspective view showing another embodiment of the lubricating pad according to the present invention and comprising a base frame of the arcuate shape;

FIGURE 4 is a perspective view showing the base frame of the pad shown in FIGURE 3 in an enlarged size, wherein spring blades are shown by chain lines;

FIGURE 5 is a plane view showing the bottom of the pad shown in FIGURE 3.

The lubricating pad according to the present invention will be explained referring to the FIGURES 1 and 2. Base members 1, 2, 3 and 4 have flat bottom portions and upright side portions 5, 6, 7, 8, 9, 10, 11 and 12 formed by bending the opposite side portions thereof, so that said base members may be of the channel shape.

The base members adjacent to each other are so hinged by pivot pins 13, 14, 15, 16, 17 and 18 in the end portions of said upright side portions 5–12 that each said member can be moved angularly in relation to each other. Thus, the base frame constructed with the base members 1 to 4 may be flexible as a whole. In the most outer base member 1, a handle 31 is formed integrally therewith by bending the outer end portion thereof. This handle 31 is serviceable to draw the lubricating pad from the axle box and at the same time to detect the oil level in the axle box. Nail pieces 20, 21, 22, 23, 24, 25, 26 and 27 are provided on the base members 1 to 4 by raising up triangular shape portions formed by forming cut-off slits of the V-shape, for retaining an oil keeping member 32 (on the base members) on the base frame. Upon positioning the oil keeping member on the base frame, it is secured with said nails 20–27. Said oil keeping member 32 has the width at least substantially equal to the distance between the opposite inner walls of the upright side portions and such a height that the upper surface is slightly below the normal oil level. Said oil keeping member 32 is made of rove-felt materials. Each of said base members 1–4 is provided with one spring blade by fixing the opposite ends to the opposite upright side portions, respectively. Said spring blades are indicated by the numeral references 33, 34, 35 and 36 and with the chain lines in FIGURE 2. The spring blades 33–36 are made of a thin steel plate and mounted on the base frame in the arcuate shape curved upwards.

An oil retaining member 37 is disposed covering the upright side portions 5–12 and the spring blades 33–36. In this case, if desired, a canvas sheet 38 is placed between the oil retaining member 37 and the spring blades 33–36 to avoid the undesired deformation of said member. Said oil retaining member is made of the felt material of roved wool, so that it may contain a sufficient amount of the oil.

Mounted on both sides of the oil retaining member 37 are oil supplying members 40 and 41 which are made of the felt material of fine wool except the top portion of said member 37. On said top portion between the upper ends of said oil supplying member 37, three rectangular elongated rods 42, 43 and 44 made of rove felt materials are disposed longitudinally and parallel to each other. Spacers 45 and 46 are disposed between the two ridges, respectively. The upper end of the oil supplying member 40, and rod 42 and the one side portion adjacent to said rod 42 of the spacer 45 are sewn together to form the ridge for supplying the oil to the axle. The upper end of the oil supplying member 41, the rod 44 and one side portion of the spacer 46 adjacent to said rod 44 are sewn together to form the ridge for supplying the oil to the axle as same as above mentioned. Other respective ends of the spacers 45 and 46 and the rod 43 are sewn together to form the ridge as same as above mentioned. The two spacers 45 and 46 are made of the fine felt, preferably. The lower portions of said canvas sheet 38, said oil retaining member 37 and both oil supplying members 40 and 41 are together fixed to the outside of the upright portions 5–12 and together with the lower ends of the spring blades 33–36 by rivets 47, 48, 49, 50, 51, 52, 53 and 54. The rivets 48, 50, 52 and 54 are shown in FIGURE 2.

When the pad shown in FIGURE 1 is inserted or drawn out into or from the axle box, it is desired that the oil supplying members 40 and 41 be easily bendable. For this object, cutoff portions 55, 56 and 57 are formed in the lower portions of the oil supplying members 40 and 41. In FIGURE 1, only the cutoff portions 55–57 of oil supplying member 41 are shown.

In the lubricating pad aforesaid, the upper surfaces of the ridges contact with the axle surface under the compressed condition of each spring blade, so that said ridges are pressed always against the axle. Therefore, the ridges will not move away from the axle. These matters result in the effective lubrication of the axle. As the oil keeping and retaining members 32 and 37 are disposed, a sufficient amount of the oil is always contained in the pad. The entire width of the pad in the lateral direction is equal substantially to the distance between the inner walls of the axle box. The length of the pad or of the members 37, 40 and 41 in the longitudinal direction is equal substantially to the axle length.

Therefore, the pad shown in FIGURE 1 is very stable when it has been inserted into the axle box. The edges of the ridges act to scrape dust attached to the axle surface. Thus, the axle is supplied with fresh oil that has been filtered by the felt materials. Another embodiment according to the present invention will be explained referring to FIGURES 3 to 5.

In this embodiment, base members 53, 54, 55 and 56 are formed into the curved shape from thin steel plate materials to conform to the shape of the inner bottom portion in an axle box having a round shape bottom. The opposite side portions of each base member are bent upwards, so that it is formed into the channel shape. The upright portions are shown by the numeral references 57, 58, 59, 60, 61, 62, 63 and 64. In these base members 53–56, triangular nail portions 65, 66, 67, 68, 69, 70, 71 and 72 are formed integral with the body portion of said base members by punching. The adjacent two base members are pivotally connected by hinge means 72, 73 and 74. Said hinge means are provided on the base members by curling the projecting end portions thereof and aligning laterally the adjacent curled portions and then inserting pivot pins into said aligned curled portions. Alternatively, any hinge means which have been prepared separately may be mounted on the joining portions of the adjacent end of the base members. In the base member 53 to be positioned in the most outer end of the base frame, a handle 75 is attached, which is formed into a loop shape with a metal wire.

The base members 54 and 55 positioned between the base members 53 and 56 positioned in both ends of the base frame have tapered edges 76, 77, 78, 79 and 80, 81, 82, 83, respectively in the longitudinal opposite edges of each base member to provide triangular spaces between the edges opposite each other. Therefore, the length of the upright side portions 57–64 is smaller than that of the intermediate portion of which the end is provided with the hinge means. Thus, the base members are provided with the upright side portions in the opposite ends thereof, nevertheless they are so moved about the pivots that the base frame may be bent as a whole. This effect makes it easy to insert or draw the pad into or out of the axle box through the narrow gap between the axle and the lower side of the opening of the axle box.

Tapered edges, similar to the tapered edges 76–83, may be provided on the base members 53 and 56 to make it more easy to bend the base frame, as illustrated in FIGURE 5.

In each base member, elongated ribs are formed by pressing to reinforce it, which ribs are indicated representatively with the numeral references 85, 86 and 87.

Springs blades 90, 91, 92 and 93 are mounted on the base members 53–56, respectively by securing the end portions thereof to the upright side portions 57–64. On the spring blades 90–93, an oil retaining member 94 made of the rove felt material is disposed. The spring blades 90–93 are bridged across the body portions of said base members so as to form the arcuate shape. Therefore, the oil retaining member 94 will have a semi-cylindrical form.

Oil supplying members 95 and 96 are placed covering the oil retaining member 94 except its top portion, which is made of the fine felt material. Three rods 97, 98 and 99 longitudinally extending from one end to the other of the oil supplying member 95 and being made of the rove felt material are disposed on the top portion exposed between the lateral ends of said oil supplying member 95. Spacer bands 100 and 101 made of the fine felt material are disposed between the rods 97 and 98 and between the rods 98 and 99, respectively. These bands are sewn to their respective adjacent rods. The inner ends of the oil supplying members are sewn to their respective adjacent rods. The oil retaining and supporting members 94 and 95, 96 are sewn together. The stitching lines are shown with the dotted lines in FIGURE 3. The unit body consists of said members, rods and spacers fixed to the upright side portions of the base members by rivets 103 together with the spring blades in their lower ends.

The operations and functions of the embodiment illustrated in FIGURES 3 to 5 are substantially the same as those of the embodiment illustrated in FIGURES 1 and 2. Therefore, the explanations relating to the operations and function are omitted.

On the base frame, an oil keeping member 104 made of the rove felt material is mounted on the nail portions 20–27.

The base member 53 of the most outside of the base frame is provided with indexing means 105 and 106 for measuring the level of the lubricant oil filled in the axle box. These means 105 and 106 may be bent portions raised up from the edge of the base member 53.

What is claimed is:

1. A lubricating pad for axles of running wheels in railroad vehicles, comprising: a plurality of base members, each comprising relatively thin metal plates having opposite side portions and opposite end portions; each of said opposite side portions being upturned to provide upright side flanges, and adjacent end portions having means for connecting said base members together; a plurality of spring blades extending arcuately in their stripped condition to bridge across said base members and fixedly connected at their opposite ends to said opposite side portions of said base members; oil retaining means for absorbing oil and constructed of fibrous material being disposed outwardly of said spring blades and having opposite end portions fixedly connected to said side portions; oil supplying means for conducting oil to the axle consisting essentially of fibrous material disposed outwardly on said oil retaining member and having its lower portions fixedly attached to said base members; at least one ridge means extending outwardly from the remainder of said pad and fixedly secured to the top portion of said pad on the opposite side of substantially the central portion of said blade members as measured from side to side for engaging with the axle for supplying lubricating oil to the axle and being constructed of fibrous materials.

2. The device of claim 1, wherein each of said base members is formed in a channel shape and connected end-to-end to form a continuous channel shaped base frame means for stably holding said pad in the axle box of the running wheel axle; the opposite ends of said spring blades, said oil retaining means and said oil supplying means, and said opposite side portions of said base members being rigidly attached together by means of common rivets.

3. The device of claim 1, wherein said base members include hinge means on their adjacent end portions for pivotally connecting them together.

4. The device of claim 1, wherein said side portions are formed by integral bent extensions; said base members include a plurality of upwardly extending pointed struck out portions forming nail means; and including a fibrous oil keeping means extending between said side portions of said base members and retained on said base members by said struck out portions for absorbing the oil in the bottom of the axle box.

5. The device of claim 1, wherein all of said base members are connected end-to-end in aligned relationship forming two outside base members and intermediate base members; one of said outside base members having its outside side portion bent upwardly to form a handle.

6. The device of claim 1, wherein at least one of said spring blades is provided for each of said base members; wherein said side portions overlap the side portions of the adjacent base member and include a pivot pin extending between the overlapping side portions, said oil keeping means being a single pad of sheet fibrous material completely filling the inside area of all of said base members.

7. The pad of claim 1, said oil retaining means being a single fibrous sheet extending continuously from adjacent side portions of said base members to the opposite adjacent side portions of said base members and substantially continuously over the entire side length of said pad as defined by the combined length of adjacent side portions of said base members; said oil supply means consisting essentially of a single sheet of fibrous material extending from the adjacent side portions on one side of said base members upwardly and arcuately to terminate short of the central portion of said arcuate spring blades and a second single fibrous sheet extending from the opposite side of said base members arcuately upwardly over said arcuate blades short of the central portion of said blades; each of said oil supply means fabric sheets extending continuously over substantially the entire length of all of the adjacent side portions of said base members; a plurality of fibrous material rods extending from one end of the pad to the opposite end of the pad and substantially parallel to each other; fibrous spacer means extending between and connected to each of said rods; said rods being fixedly connected to said spacer means and adjacent portions of said oil supply means sheets; said rods, spacer means and adjacent portions of said oil supply means sheets extending radially outwardly from said spring blades to form a plurality of elongated parallel ridges covering substantially the entire end to end length of said pad and being spaced from each other to constitute the only engagement with the axle.

8. The pad of claim 7, wherein each of said oil supply means fibrous sheets having cut out portions in their side edge adjacent to said side portions in the vicinity of the pivotal connection between said base members for improving the flexibility of the pad and to facilitate relative pivoting of the base members during insertion of the pad in the axle box.

9. The pad of claim 8, wherein each of said base members is formed in a channel shape and connected end-to-end to form a continuous channel shaped base frame means for stably holding said pad in the axle box of the running wheel axle; the opposite ends of said spring blades, said oil retaining means and said oil supplying means, and said opposite side portions of said base members being rigidly attached together by means of common rivets, wherein said base members include hinge means on their adjacent end portions of pivotally connecting them together, wherein said side portions are formed by integral bent extensions; said base members include a plurality of upwardly extending pointed struck out portions forming nail means; and including a fibrous oil keeping means extending between said side portions of said base members and retained on said base members by said struck out portions for absorbing the oil in the bottom of the axle box; wherein all of said base members are connected end-to-end in aligned relationship forming two outside base members and intermediate base members; one of said outside base members having its outside side portion bent upwardly to form a handle; wherein at least one of said spring blades is provided for each of said base members; wherein said side portions overlap the side portions of the adjacent base member and include a pivot pin extending between the overlapping side portions, said oil keeping means being a single pad of sheet fibrous material completely filling the inside area of all of said base members.

References Cited
UNITED STATES PATENTS

| | | | |
|---|---|---|---|
| 215,508 | 5/1879 | Covel | 308—88 |
| 1,720,445 | 7/1929 | Royal | 308—88 |
| 2,123,654 | 7/1938 | McCormick | 308—88 |
| 2,385,280 | 9/1945 | Howard | 308—88 |
| 2,023,991 | 12/1935 | Cardwell | 308—88 |
| 3,004,805 | 10/1961 | Hoyer et al. | 308—88 |

FOREIGN PATENTS 7,079  1900  Great Britain.

LAVERNE D. GEIGER, *Primary Examiner.*

E. J. EARLS, *Assistant Examiner.*